Jan. 13, 1942.     K. E. CROOKS     2,269,927
COMPOSITE FLOOR AND FLOOR UNIT FOR FORMING THE SAME
Filed July 27, 1939
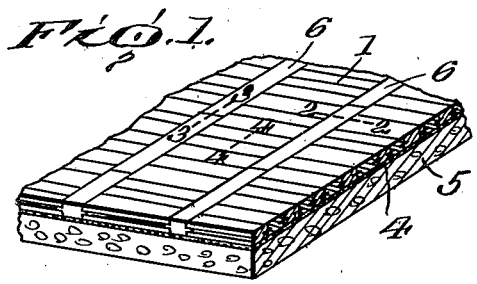
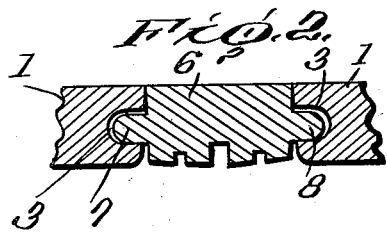 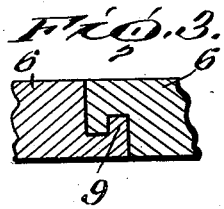 
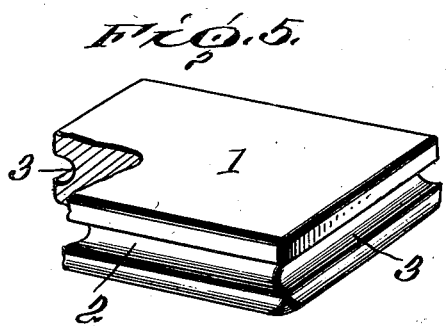
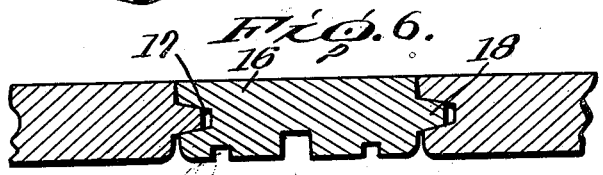
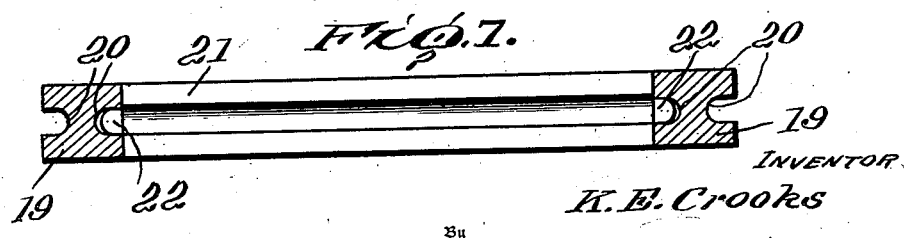
INVENTOR
K. E. Crooks
By Pattison Wright & Pattison
ATTORNEYS Patented Jan. 13, 1942

2,269,927

UNITED STATES PATENT OFFICE 2,269,927

COMPOSITE FLOOR AND FLOOR UNIT FOR FORMING THE SAME

Kenneth E. Crooks, Williamsport, Pa.

Application July 27, 1939, Serial No. 286,909

1 Claim. (Cl. 20—7)

This invention relates to a composite floor and floor unit for forming the same and is a continuation in part of my application Serial No. 249,647, filed January 6, 1939. The main object of my invention is to produce a composite floor member economically by using a floor unit formed from a commercial board as it comes from the saw mill with saw kerf edges by only dressing the same to thickness and grooving a portion of the side edges thereof, thereby practically eliminating waste and reducing the time, labor and expense in manufacturing the same.

In manufacturing a commercial board at a saw mill from a log, it is sawed from the log to a predetermined thickness and the edges, edged with a saw and the boards have saw kerf edges and vary in width according to the size of the log and as commercial lumber as now sold varies greatly in width, one of the objects of my invention is to construct a floor unit from a commercial board which has only been dressed as to thickness and cut transversely into a plurality of pieces and by using these pieces to form a composite floor without dressing the portion of the side edges above the grooves, I am able to use the entire surface area of the commercial board, as offal by ripping, is entirely eliminated and the only waste is in squaring the ends and the width of the saw kerf produced in cutting the board crosswise into pieces.

In constructing a floor unit in accordance with my invention, I am able to use the entire surface area of a commercial board as it comes from a saw mill with saw kerf edges as the same is not reduced as to width by ripping the same or by forming mastic receiving grooves in the side edges and tongue receiving grooves in the ends, the entire upper surface of the board forms a floor surface when the units are arranged in rows to form a composite floor on a bed of mastic.

Prior to my invention there was a great deal of waste in manufacturing floor units as floor units were formed either to a predetermined width or a predetermined size by ripping a board which produced an offal while with my floor unit, in one embodiment the entire surface area of the commercial board is used and in another embodiment the surface area is only reduced by forming a tongue.

By arranging the floor boards in rows on a subfloor, I am able to use the boards of undetermined promiscuous widths as they come from the saw mill without dressing the side edges and I take advantage of the saw kerf edges to form expansion joints between the boards.

As far as I am aware I am the first in the art to utilize the full width of a commercial board to form a floor unit of boards varying greatly in width, with their rough side edges in contact with one another and arranged in rows whereby the rough side edges form expansion joints as they yield as the boards expand to compensate for expansion and as the boards are yieldably held on a subfloor by a permanently plastic mastic, I am able to limit expansion and contraction in two directions and control expansion to a nicety.

Other and further objects and advantages of the invention will be more fully set forth in the appended claim.

In the drawing,

Figure 1 is a perspective view of one embodiment of my invention in which sectional stiles are used to form the tongue and groove connection between the ends of the flooring units, the stiles being arranged in spaced relation to one another to form guideways in which the floor units are slidably mounted so as to allow the same to expand and contract, the stiles and floor units being arranged on a bed of plastic mastic disposed on a subfloor;

Figure 2 is a section taken on line 2—2 of Figure 1;

Figure 3 is a section taken on line 3—3 of Figure 1;

Figure 4 is a section taken on line 4—4 of Figure 1;

Figure 5 is a perspective view of one of the units detached;

Figure 6 is a detail section through a modified form of stile and floor unit; and Figure 7 is a detail section through another modified form of stile and floor unit.

In carrying out my invention the floor units are formed from commercial lumber as it comes from a saw mill with saw kerf edges. As disclosed in my application, Serial No. 249,647 in sawing a log to produce commercial boards, the boards vary in width according to the size of the log and are of undetermined promiscuous width and vary in length in accordance with the length of the log from which they are sawed. Now these boards have saw kerf edges produced by edging at the saw mill and I take advantage of these rough edges to form an expansion joint in forming floor units in accordance with my invention.

My invention consists in using a board of any width and of any length and sawing the board transversely into a plurality of pieces of predetermined lengths so as to practically utilize the entire board as the pieces can vary as to length and used to form floor units in forming a composite floor in accordance with my invention, these units being capable of being assorted as to length and arranged in rows, the unit in each row being of the same length, and the length of the unit in one row can be shorter or longer than the length of the unit in the adjacent row or the length of the units in each row forming a floor can be all of the same length whereby I am able to form a composite floor of commercial boards in such a manner that waste is greatly reduced not only as to width but as to length.

A commercial board as it comes from a saw mill may be of any length and of any width according to the size of the log and length of the log from which it is sawed and the widths of the board vary as low as a fraction of an inch.

Now as an example I will start with a board 12' in length. The board is first dressed on one or both faces as to thickness and the side edges are preferably grooved without distorting the saw kerf edges. If I desire to form a floor unit 18" in length, I first square one end by cross cutting with a saw and then by cross cutting with a saw I am able to cut seven pieces therefrom to form floor units 18" long and one piece to form a floor unit 16" long so that the only waste is the width of the saw kerf in cross cutting and squaring of the ends.

The floor units are then passed through a machine to form either a tongue or a groove on its end and grooves in the side edges and the unit is a finished product ready to be laid as a floor unit.

While I preferably dress the face and groove the side edges of a commercial board before cutting the same into pieces to form floor units, I am aware that a commercial board can be first cut into pieces, dressed as to thickness and then grooved and therefore I do not wish to limit myself to the forming of the grooves and tongues in the boards.

Now in manufacturing flooring either in strip or block form, which is made to certain dimensions in width and causes a lot of waste and it must be apparent that when, for example, a 3" wide tongue and groove flooring is cut from a commercial board of approximately 12" wide, there is a waste of 2" in the edging cut therefrom while with my construction this is entirely eliminated as I utilize the entire width of the commercial board which varies in width as small as a fraction of an inch, and by using the saw kerf contact joints between the side edges of the flooring units, I eliminate waste by not skinning or the forming of a tongue so that the entire width of the commercial board is used in forming a flooring as ripping is entirely eliminated.

In the embodiment of my invention as illustrated in Figures 1, 2, 3, 4 and 5, the floor units I formed of pieces cut from a commercial board are provided with mastic receiving grooves 2 along their side edges and tongue receiving grooves 3 in their ends and are disposed in rows on a mastic bed 4 arranged on a subfloor 5 herein shown of concrete. The rows of floor units are spaced apart and disposed in the spaces between the rows are sectional stiles 6 provided with tongues 7 and 8 along their side edges which extend into the grooves 3 in the ends of the board to form an interlocking tongue and groove connection between the boards and sectional stiles. The ends of the stiles are interlocked together by a lap joint 9 as shown in Figures 3 to prevent the sections from pulling apart as the boards expand. This provides a composite floor in which all of the units are directly or indirectly connected together, the floor units being movably mounted between the stiles which act as guideways to allow each unit in each row to expand and contract independent of one another and in respect to the stiles whereby I am able to confine expansion and contraction to two directions.

The grooves 2 are formed in the side edges of the units without dressing the contacting edges thereby enabling me to use the saw kerf edge to form an expansion joint between the contacting side edges of the units to compensate for part of the expansion of the units. The saw kerf edges prevent the side edges of the units from being forced tightly in engagement with one another in laying and as the area of contact between the side edges is reduced, these rough edges are compressed first as the units expand so as to compensate for part of the expansion of the units. After the saw kerf edges have been compressed by the expansion of the units, the units are free to move in two directions between the stiles which act as guides and help to maintain the units in contact with the adhesive material which yields to allow the units to move in respect to the subfloor without pulling away therefrom. The underside of the stiles are preferably rounded transversely and provided with mastic receiving grooves as shown in Figure 2.

In the embodiment shown in Figure 7 the sectional stile 19 is provided with grooves 20 along its side edges and the floor boards 21 are provided with tongues 22 at their ends to form an interlocking connection between the boards and stiles.

While I preferably dress one or both faces of the unit before laying, I found in practice a beautiful rustic composite floor can be constructed from a floor board formed from commercial boards as they come from the sawmill of undetermined promiscuous widths without dressing any portion thereof. Occasionally some parts of the surface of the board might be hairy. This I remove, either before or after the floor board has been installed, with a slight application of metal wool, sandpaper or the like but without removing the rough sawkerf effect and therefore I do not wish to limit myself to the dressing of the board before it is laid to form a floor unit.

It can be treated with a water-repellant solution before laying or after being laid or could be prefinished as disclosed in the above referred to application, therefore I do not wish to limit myself to any particular treatment of the same.

Floor units cut from undressed commercial boards will vary slightly in thickness. This slight variation in thickness between the abutting floor units is desirable in producing a tile or mosaic effect.

In all of the forms of floor units illustrated and described, the side edges of the units are grooved and the portions above the grooves are not disturbed and remain rough as produced by the edging with a saw and the portion below the groove is cut away and rounded as clearly shown to facilitate the assembling of the blocks or units and the grooves of the two abutting units form a substantially dove-tailed shaped groove to receive mastic for keying the side edges of the units together and to the subfloor.

While I preferably form grooves in the side edges of the units, I am aware that a floor unit constructed in accordance with my invention could be formed and used for forming a composite floor without grooves in its side edges.

From the foregoing description it will be seen that offal is entirely eliminated as the commercial board is not ripped or the width reduced in any way whereby I not only reduce waste but reduce time and labor and expense in forming a floor unit and at the same time take advantage of the saw kerf edges to form an expansion joint between the units.

What I claim is:

A composite floor comprising, in combination, a subfloor, a layer of adhesive mastic arranged on said subfloor and adhering thereto, a plurality of sectional wooden stiles and a plurality of wooden floor boards of undetermined promiscuous widths having saw kerf side edges arranged on said layer of mastic and adhering thereto, the stiles being arranged on the subfloor with their abutting ends in engagement with one another to form guideways, the floor boards of undetermined promiscuous widths being arranged on the subfloor in rows between the stiles with their saw kerf side edges in contact with one another and interlocked at their ends to the stiles by tongue and groove sliding connections to permit each board to move independently in respect to one another longitudinally in two directions in the guideway formed by the stiles as said boards expand and contract and to allow the saw kerf edges to yield as said boards expand.

KENNETH E. CROOKS.